(No Model.)　　　　　　N. W. HOLT.　　　4 Sheets—Sheet 1.
SEPARATING MACHINE.
No. 422,943.　　　　　　　　Patented Mar. 11, 1890.
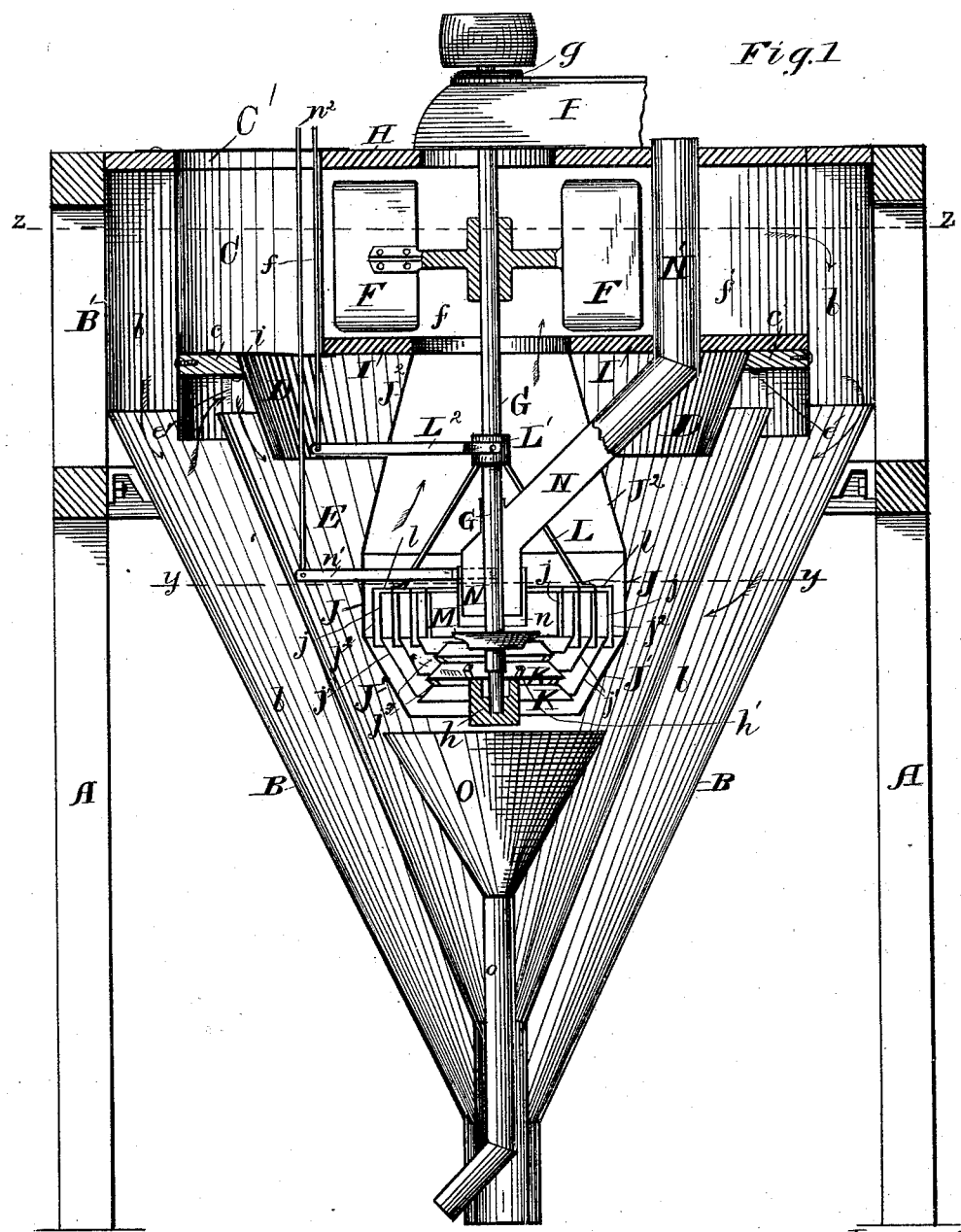
Witnesses:　　　　　　　　　　　　　　Inventor:
J. C. Turner　　　　　　　　　　　　　Noah W. Holt
J. W. McGinn　　　　　　　　　　　　　by Doubleday & Bliss
　　　　　　　　　　　　　　　　　　　　atty.

(No Model.) 4 Sheets—Sheet 2.
N. W. HOLT.
SEPARATING MACHINE.
No. 422,943. Patented Mar. 11, 1890.
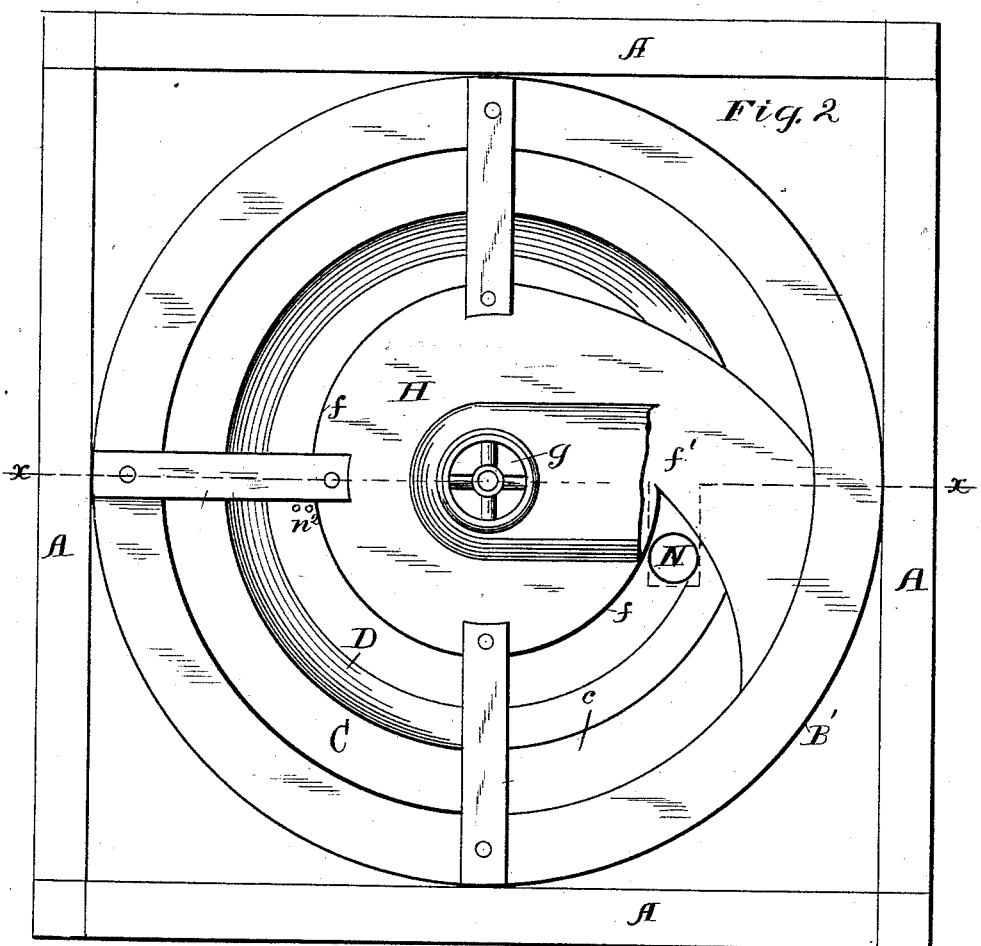
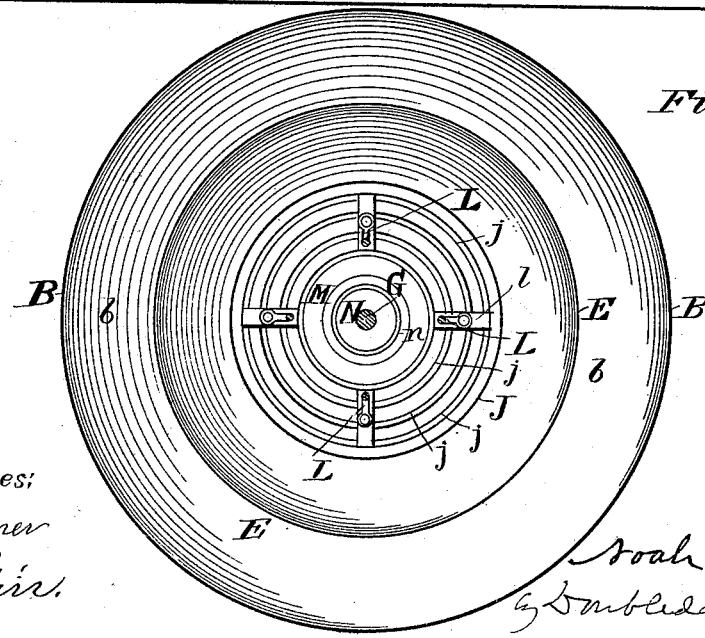

(No Model.)

N. W. HOLT.

SEPARATING MACHINE.

No. 422,943. Patented Mar. 11, 1890.

Witnesses:

Inventor

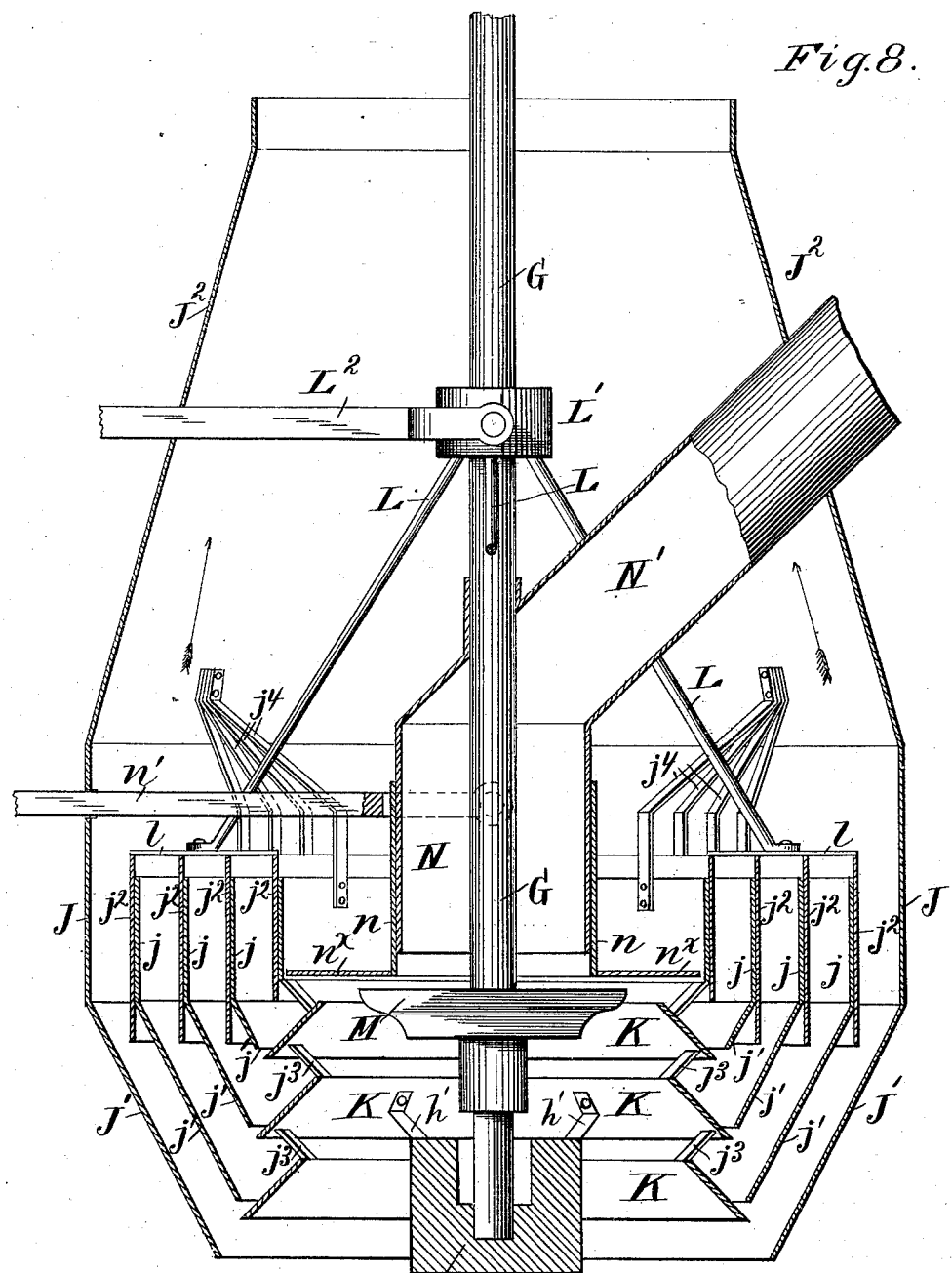

UNITED STATES PATENT OFFICE.

NOAH WILLIAM HOLT, OF MANCHESTER, MICHIGAN.

SEPARATING-MACHINE.

SPECIFICATION forming part of Letters Patent No. 422,943, dated March 11, 1890.

Application filed April 19, 1888. Renewed February 12, 1890. Serial No. 340,215. (No model.)

*To all whom it may concern:*

Be it known that I, NOAH WILLIAM HOLT, a citizen of the United States, residing at Manchester, in the county of Washtenaw and State of Michigan, have invented certain new and useful Improvements in Separating-Machines, of which the following is a specification, reference being had therein to the accompanying drawings.

Figure 4:
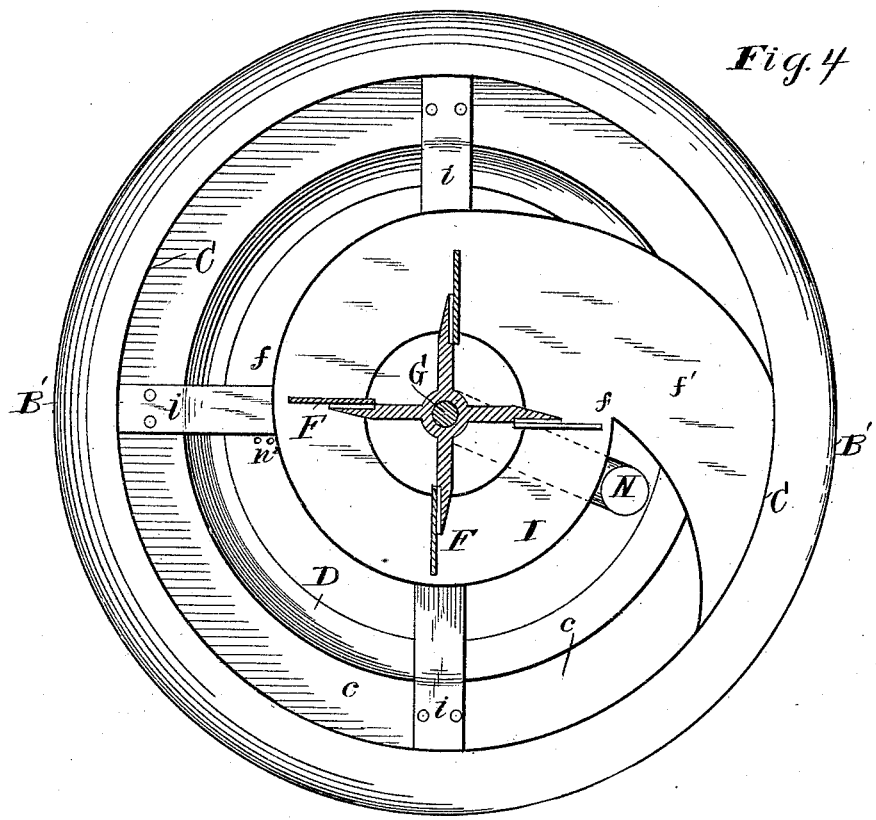
Figure 5:
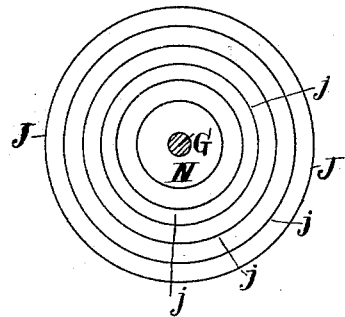
Figure 7:
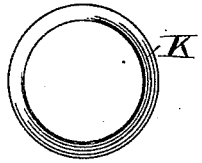
Figure 6:
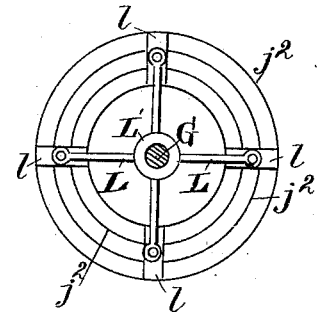

Figure 1 is a central vertical section of a machine containing my invention, taken on line $x\ x$, Fig. 2. Fig. 2 is a top or plan view. Fig. 3 is a horizontal section on line $y\ y$, Fig. 1. Fig. 4 is a horizontal section on line $z\ z$, Fig. 1. Figs. 5, 6, and 7 are details. Fig. 8 is a central vertical section enlarged of parts of the machine inclosed within the shell or casing of the aspirator.

This invention relates to a separating-machine in which the material is divided into different grades according to its specific gravity, both the heavier and lighter particles being delivered through their respective outlets.

In working my invention I propose to combine an aspirator of any suitable construction with an inclosing separating-chamber under such an arrangement of parts that air-currents after passing through the aspirator and the material within the aspirator are directed into the interior of the surrounding separating-chamber in which the material taken out from within the aspirator is separated from the air-current within the separating-chamber by centrifugal action.

According to one method which I propose to employ, the upper part of the aspirator is connected with the eye of a fan-case, so that air is drawn through the aspirator by the exhaust action of the fan, the casing being provided with an air-outlet communicating with the separating-chamber, whereby air from which such material has been separated can escape into the room in which the machine is located.

Referring particularly to Figs. 1 to 4 of the drawings, A A represent, generally, a supporting frame-work.

B B' is an inclosing shell or casing, of which the lower part B is funnel-shaped, the upper part B' being preferably circular in cross-section and of uniform diameter throughout.

C is a guard to assist in determining the movement of an air-current, preferably circular in cross-section and of uniform diameter, but of less diameter than the shell B and arranged concentric therewith, these parts forming between them an annular chamber $b$, closed at its upper side by a deck or top plate.

$c$ is a flange projecting inward from the guard C a short distance above its lower edge, and is by preference made of wood and secured by screws passing through the guard and into the periphery of this flange.

D is a ring or downwardly-projecting flange connected at its upper edge to the inner edge of the flange $c$, and preferably funnel-shaped, as indicated, to assist in deflecting or conducting the air-current downward within a shell which I will now describe.

E is a funnel-shaped shell concentric to the outer shell B, and somewhat larger at its upper end than is the flange D at its lower edge, which projects down a short distance within the shell E. I propose to connect the upper end of this shell E with either the guard C or the shell D, or both, by means of ties or braces $e\ e$. (See Fig. 1.) In connection with these shells or casings I propose to use an aspirator for the purpose of separating material into different grades, according to the size and specific gravity of the parts of which it is composed, and will proceed to describe one form of such aspirator which I have found well adapted for the carrying out of my invention.

F F are the blades of the fan. The vertical shaft G is supported at its lower end in a bearing or step $h$, which is connected to and carried by other parts of the machine, as will be explained.

I is the bottom wall or head of the fan-case, which is connected to and supported upon the flange $c$ by means of arms or brackets $i\ i$. The shell $f$ of the fan-case is situated within the guard C. Preferably it is not circular, but somewhat scroll-shaped, as indicated in Figs. 2 and 4, the mouth of the fan-case passing through the guard C and opening into the annular space or dust-separating chamber between the concentric shell B' and guard C, the latter serving to insure that the air discharged through the mouth of the fan will rotate and form a vortex within the separating-chamber without any part of it being permitted to escape directly from the fan through the air-outlet C' between this guard and the fan-case. The section $f'$ of this wall of this annular space may be made in a separate piece, or it may consist of one end of the part $f$ bent backward, so as to form one side of the mouth of the fan.

J J' J² represent the outer shell or inclosing-casing of an aspirator, the open upper end of which connects with the eye of the fan-case, and, in fact, by preference is fitted tightly into this eye and is secured thereto by screws or pins, when that head of the fan-case is made of wood; or it may be soldered thereto when that head is made of sheet metal. By preference the central or intermediate section J of this aspirator-shell is not only circular, but cylindrical, and $jj$ are a series of rings of different diameters arranged concentrically within the part J.

$j' j'$ are a series of funnel-shaped rings arranged one within another and each connected at its upper edge to the lower edge of one of the cylinder-shaped rings $j$. Thus there is formed within the shell of the aspirator a series of annular chambers. (See particularly Figs. 1 and 3.)

K K are a series of outwardly-flaring rings, three in number and of different diameters, the upper and smallest one being suspended by its upper edge from the lower edge of the inner funnel-shaped ring $j'$—as, for example, by ties $j^3$. The next larger ring K is suspended in like manner from the next larger of the funnel-shaped rings $j$, and so on. The fan-shaft bearing $h$ is suspended by links $h'$ from one of these flaring rings.

L L' are respectively the arms and hollow sleeve of a spider, the spokes or arms L of which are inclined downward and outward from the sleeve L' and are at their lower ends attached to horizontal plates or bars $l$ by riveting or soldering; or these arms L may be bent outward on horizontal lines to take the place of the plates $l$.

$j^2 j^2$ represent a series of valves, rings, or dampers attached by their upper edges to the plates or bars $l$ and fitting closely the outer faces of the rings $jj$ and projecting downward below their lower edges (when in the position shown in Fig. 1) and into the annular spaces or channels or throats between the funnel-shaped rings $j' j'$ and between the outermost of these rings and the part J' of the aspirator-shell. I prefer to connect the series of rings $j j'$ K with the section J² of the shell of the aspirator by means of a series of ties $j^4$, the bearing $h$ being supported by ties $h'$, which connect it with one of the rings K. (See particularly Fig. 8.)

L² is a lever or valve-stem projecting through the fan-head and the shell J² and connected at its inner end to the sleeve L', whereby the valves may be operated by lifting the spider and all of the valves simultaneously to regulate the strength and velocity of the air-currents.

M is a feeding-disk of any ordinary sort attached to and carried by the fan-shaft G.

N $n$ is a feeder-tube, of which the outer ring $n$ is adjustable by link-lever $n' n^2$ relatively to the disk M, as is customary in that kind of feeder, and carries at its lower end an outwardly-projecting flange $n^x$, (see Fig. 8,) which practically closes the space between the feeder-tube and the lower end of the innermost ring $j$.

N' is a feed-spout.

O is a hopper, and $o$ a delivery-spout.

P is an air-trunk leading from the upper eye of the fan to any source, from which may be derived or received a dust-laden air-current.

The machine may be operated as follows: The fan being put into operation by means of a belt from any suitable motor to the pulley on the upper end of the fan-shaft, an air current will be drawn in through the eye of the fan-case and discharged through its mouth into the separating-chamber $b$. From this chamber the air moves around below the lower edge of the guard C, thence down between the shells D E, substantially as indicated by arrows in Fig. 1, with a sort of rotary whirling motion, during which the fine particles of material which have been introduced within these chambers by the air-current are separated therefrom by centrifugal action and pass out at the bottom of the machine. The air thus freed from the dust and other material which has been mixed with it passes over the top of the shell E, down between said shell and the ring D, out of the separating-chamber, part going through the aspirator and through the lower eye of the fan back into the separating-chamber. The material upon being fed into the machine through the feed-spout N' into the tube N $n$ of the feeder is distributed by the disk M, which delivers it in a thin sheet or spray over the outer surfaces of the flaring rings K K, whence it passes in part into the hopper O and feed-spout $o$, the lighter particles being taken out by the ascending air-currents, as is common in many of the well-known forms of aspirator in common use, passing hence through the fan and its throat or mouth into the separating-chamber, where the operation above described is repeated. Part of the air may, however, pass up through the space between the ring D and the aspirator-shell and thence through the space between the shell F of the fan-case and the guard C, and out at the top of the machine. There is of course a tendency to draw a current of air through the feed-spout with the material to be separated, and also to draw air through the air-trunk P, and to provide against any injurious results from an undue pressure being created within the machine, even though there be no absolute current air moved through the air-trunk. I propose to construct the machine with such air-outlet through the casing.

Another mode of operating the machine is to discharge through the air-trunk P and into the eye of the fan an air-current laden with material to be separated, in which case the above-described operations may be repeated, except as to the taking out of material within the aspirator, the air-currents, however, following substantially the same path. Again, the machine may be used to separate into different grades material delivered into it through both the air-trunk P and the feed-spout N'. Thus the machine is adapted for use under a great variety of circumstances. The ascending air-current in traveling in an upward direction through the aspirator travels through the annular throats which are formed for it between the rings $jj'$ and between these rings and the outer shell or casing J J', the strength of the air-current being regulated by the series of valves or dampers $j^2 j^2$, the lower edges of which project down into the spaces between the funnel-shaped rings and between these rings and the casing J'. The vertical position of these valves may be varied by means of the lever $L^2$ and the link which extends upward from the outer end of the lever, the shell $J^2$ serving as a fulcrum for the lever. So, also, the rate of feed may be regulated by raising or lowering the outer ring $n$ through the medium of the lever $n'$, fulcrumed in the shell J, and the vertical link $n^2$. Of course the relative proportion of air (moved by the fan) which is taken through the aspirator will depend upon the resistance which is interposed to the air-supply through the upper and lower eye, respectively, of the fan-case, it being understood that the fan will draw the greater part of its supply through whichever of these two openings offers the less resistance, either by reason of its size or of its connections with the surrounding atmosphere.

While I prefer to produce the blast for the aspirator by means of a fan arranged within the machine, on account, among other things, of the compactness of such construction, yet I do not wish to be limited to such construction, it being apparent that substantially the same results might be obtained under other relative arrangements of fan, aspirator, and inclosing-casing.

What I claim is—

1. The combination, in a separating-machine, of an aspirator, an inclosing-shell forming a separating-chamber surrounding the aspirator, means whereby the air is caused to rotate within the separating-chamber, an air-trunk separate and apart from the aspirator and adapted to conduct material to the separating-chamber, and an air-outlet for the discharge of air from the separating-chamber, substantially as set forth.

2. The combination, in a separating-machine, of an aspirator, an inclosing-shell forming a separating-chamber surrounding the aspirator, means located within the upper part of the separating-chamber whereby the air is caused to rotate within the separating-chamber, an air-trunk separate and apart from the aspirator and adapted to conduct material to the separating-chamber, and an air-outlet for the discharge of air from the separating-chamber, substantially as set forth.

3. The combination, in a separating-machine, of an aspirator, an inclosing-shell forming a separating-chamber surrounding the aspirator, the fan whereby the air is caused to rotate within the separating-chamber, and an air-outlet between the fan and the casing of the machine for the discharge of air from the separating-chamber, substantially as set forth.

4. The combination, in a separating-machine, of an aspirator, an inclosing-shell forming a separating-chamber surrounding the aspirator, a fan within the casing and having its lower eye connected with the aspirator and its mouth opening into the separating-chamber, an air-outlet in the upper part of the machine, and a guard between the shell of the separating-chamber and the air-outlet, substantially as set forth.

5. The combination, in a separating-machine, of an aspirator, an inclosing-shell forming a separating-chamber surrounding the aspirator, a fan within the separating-chamber and having its lower eye connected with the aspirator, an air-trunk connected with the upper eye of the fan, and an air-outlet for the discharge of air from the separating-chamber, substantially as set forth.

6. The combination, in a separating-machine, of an aspirator, an inclosing-shell forming a separating-chamber surrounding the aspirator, means whereby the air is caused to rotate within the separating-chamber, a funnel-shaped shell between the aspirator and the inclosing-shell of the machine, the guard, and an air-outlet for the discharge of air from the separating-chamber, substantially as set forth.

7. The combination, in a separating-machine, of an aspirator, an inclosing-shell forming a separating-chamber surrounding the aspirator, means whereby the air is caused to rotate within the separating-chamber, a funnel-shaped shell between the aspirator and the inclosing-shell of the machine, the downwardly-projecting flange D, and an outlet adapted to discharge air from the separating-chamber through the flange D, substantially as set forth.

8. The combination, in a separating-machine, of an aspirator, an inclosing-shell forming a separating-chamber surrounding the aspirator, a fan within the casing and having its lower eye connected with the aspirator and its mouth opening into the separating-chamber, an air-outlet in the upper part of the machine, a guard between the shell of the separator and the air-outlet, and a funnel-shaped shell between the aspirator and the inclosing-shell of the machine, the flange D, and the flange c, substantially as set forth.

In testimony whereof I affix my signature in presence of two witnesses.

NOAH WILLIAM HOLT.

Witnesses:
H. H. DOUBLEDAY,
B. W. SOMMERS.